United States Patent [19]

Heuvelsland

[11] Patent Number: 5,070,125

[45] Date of Patent: Dec. 3, 1991

[54] PRODUCTION OF POLYETHER POLYOLS WITH REDUCED UNSATURATION

[75] Inventor: Albert J. Heuvelsland, Heikant, Netherlands

[73] Assignee: The Dow Chemical Company, Midland, Mich.

[21] Appl. No.: 638,877

[22] Filed: Jan. 8, 1991

Related U.S. Application Data

[63] Continuation of Ser. No. 273,375, Nov. 18, 1988, Pat. No. 5,010,187.

[51] Int. Cl.$^5$ ............................................. C08G 18/06
[52] U.S. Cl. .................................. 124/155; 521/167; 521/174; 521/128; 528/57; 536/120; 252/609
[58] Field of Search .................. 528/57; 521/128, 167, 521/174; 536/120; 252/609; 524/155

[56] References Cited

U.S. PATENT DOCUMENTS 4,134,610  1/1979  Lindewall ............................ 524/128
4,920,167  4/1990  Ruetman et al. ..................... 524/155

Primary Examiner—John Kight, III
Assistant Examiner—Duc Truong

[57] ABSTRACT

Polyether polyols having an equivalent weight of from about 200 to about 5000 are prepared by the process of this invention. The process uses barium- or strontium-containing alkoxylation catalysts to provide products with reduced unsaturation in comparison to similar products produced with potassium hydroxide catalysis. The use of these catalysts also increases the capping efficiency with ethylene oxide to provide products with a higher primary hyroxyl content for the same weight percentage of ethylene oxide cap.

1 Claim, No Drawings

PRODUCTION OF POLYETHER POLYOLS WITH REDUCED UNSATURATION

This application is a continuation of U.S. Ser. No. 07/273,375 filed 11/18/88 now U.S. Pat. No. 5,010,187.

FIELD OF INVENTION

This invention relates to an improved process for the preparation of polyether polyols having reduced amounts of unsaturation.

BACKGROUND OF THE INVENTION

Polyols for use in preparing polyurethanes are usually prepared by the reaction of an initiator compound having active hydrogens with an alkylene oxide in the presence of a basic catalyst such as a tertiary amine, sodium and potassium hydroxide or alkoxide. However, the use of these catalysts, although commonplace, leads to the production of polyols which can contain high levels of unsaturation, especially when such polyols are of high equivalent weight.

In the base-catalyzed addition of propylene oxide to initiators containing active hydrogens, the growing polyether chains are terminated predominantly with secondary hydroxy groups. However, under the conditions of the reaction, temperature, pressure and catalyst concentration, the propylene oxide may isomerize to give an allyl alcohol before it can react with the initiator.

The ability to prepare high equivalent weight products in the presence of the allyl alcohol is reduced as these compounds themselves contain an active hydrogen which can react with propylene oxide. The problem of unsaturation becomes more severe as the equivalent weight of the polyol becomes greater.

The types of terminal unsaturation and means of reducing it by acid treatment of the end product are discussed by Dege et al., *Journal of the American Chemical Society*, p. 3374, Vol. 81 (1959).

When polyols of high equivalent weight and high unsaturation are used in the preparation of polyurethane polymers such as flexible foams, products with undesirable properties can result. Problems such as foam discoloration, inferior compressive and tensile strengths, low reactivity, low flexural modulus and poor humid aging may be encountered.

Unsaturation in polyols to be used in preparing polyurethane polymers can be reduced by acid treatment of the product resulting from the reaction of an initiator with alkylene oxide as described in U.S. Pat. Nos. 2,996,550 and 3,271,462.

U.S. Pat. No. 3,393,243 teaches the use of the Group IA metal catalyst caesium hydroxide for the preparation of polyoxypropylene polyether polyols having an equivalent weight of 1500 to 2500 and reduced levels of unsaturation. This catalyst is much more costly than the alternative basic catalysts, as it is required in larger quantities to operate at an equivalent molar concentration due to the high molecular weight of caesium.

The use of caesium hydroxide as catalyst in the alkoxylation reaction of alcohols giving products with low unsaturation levels has recently been documented, see patents EP 268,922-A and EP 268,920-A.

It is desirable to develop a process which can achieve the preparation of polyether polyols with reduced unsaturation and reduce or eliminate the use of expensive catalysts such as caesium hydroxide and/or the acid treatment of the reaction product.

The use of barium-containing catalysts in the presence of catalyst promoters is described for the ethoxylation reactions of alkanols to make nonionic surfactants, see, for example, U.S. Pat. No. 4,210,764; 4,239,917 and EP 46,647.

The Japanese patent 55/092,733-A teaches the use of barium hydroxide in combination with a carbon dioxide finishing process for the preparation of preferably ethylene oxide containing polyether polyols having equivalent weights of 187 or less. The products so produced are suitable for the preparation of rigid or semi-rigid polyurethane foam due to their very low residual alkoxylation catalyst content.

SUMMARY OF THE INVENTION

It has now been discovered that polyether polyols of high equivalent weights and reduced unsaturation can be prepared when using catalysts containing the alkali earth metals, barium and strontium. Further, it has been discovered that the use of such catalyst leads to a greater capping efficiency. By the expression "capping efficiency" it is meant that when, for example, a secondary OH-terminated polyol is reacted with ethylene oxide, a higher primary hydroxyl content for the same ethylene oxide capping percentage and equivalent weight is obtained in the end product. For a given quantity of polyol and ethylene oxide, the resulting primary hydroxyl content is higher and thus capping efficiency with ethylene oxide is greater when employing such catalyst.

In a second aspect, this invention is a process for the preparation of a polyol having an equivalent weight of about 200 to 5,000 by the reaction of a monoepoxy compound with an initiator containing at least two active hydrogens in the presence of a catalyst, the improvement comprising employing as said catalyst a substance selected from the group consisting of barium, strontium and their oxides, hydroxides, hydrated hydroxides or monohydroxide salts, or mixtures thereof.

In another aspect, this invention is a polyoxyalkylene composition comprising (a) a polyoxyalkylene polyol having an equivalent weight from about 200 to about 5,000 and an average functionality of about 2 to about 8, and (b) from about 0.5 to about 20,000 ppm of a metal catalyst selected from the group consisting of barium, strontium and their oxides, hydroxides, hydrated hydroxides or monohydroxide salts, or mixtures thereof.

In a third aspect, this invention is a polyurethane polymer prepared by reaction of a polyisocyanate with an active hydrogen-containing composition, wherein the active hydrogen-containing composition comprises at least one polyol prepared by the process of the invention.

Surprisingly, this invention provides for the preparation of high equivalent weight polyols with reduced unsaturation. The process of the invention also surprisingly allows for the production of polyols with an improved capping efficiency (higher primary hydroxyl content for the same ethylene oxide capping percentage and overall equivalent weight of polyol). In addition, this invention allows for the products to be prepared with reduced batch times at higher reaction temperatures and catalyst concentrations than can normally be used when employing potassium hydroxide catalysis, without disadvantageously increasing unsaturation levels. Unsaturation is significantly reduced, often by more than 50 percent. When polyether polyols are prepared with an ethylene oxide cap, the resulting primary hydroxyl content can be increased by up to 6 percent in comparison to the similarly prepared products using potassium hydroxide catalysis.

DETAILED DESCRIPTION OF THE INVENTION

As described hereinabove a polyol having an equivalent weight from about 200 to 5,000 and low unsaturation levels can be prepared by the alkoxylation of an initiator containing from 2 to 8 active hydrogens in the presence of a catalyst containing barium or strontium. Active hydrogens for the purpose of this invention are defined as those hydrogens which react positively in the well-known Zerewitinoff test. See Kohler, *Journal of the American Chemical Society*, p. 3181, Vol. 49 (1927). Representative active hydrogen-containing groups include —OH, —COOH, —SH and —NHR where R can be hydrogen, alkyl, cycloalkyl, aryl aromatic and the like. The hydroxyl groups of the initiators can be of primary or secondary character. It can be advantageous for reasons of catalyst solubility to have an initiator or initiator mixture which has a primary hydroxyl content.

Examples of suitable initiators are those having equivalent weights from 5 to 1,500 and include water, glycerine, trimethylolpropane, pentaerythritol, hexane triol and various isomers, carbohydrate compounds such as lactose, α-methylglucoside, α-hydroxyethylglucoside, hexitol, heptitol, sorbitol, dextrose, mannitol, sucrose and amine compounds such as ammonia, ethylenediamine, diethylenetriamine, aminoethylpiperazine, aniline, diaminotoluene and aromatic compounds such as the condensates of a phenol with acetone or formaldehyde or the condensation product of a phenol with formaldehyde and an alkanolamine, mixtures thereof and the like. Other suitable initiators also include polyoxyalkylene glycols and polyols. Other initiators which can be employed include those disclosed in U.S. Pat. Nos. 4,269,945 and 4,394,431, all of which are incorporated herein by reference.

Particularly suitable initiators for preparation of the polyols by the process of this invention are those having from two to four active hydrogens and an equivalent weight from 9 to 750 and preferably from 9 to 150. The preferred initiators include water, ethylene glycol, 1,2-propylene glycol, 1,3-propylene glycol, the various isomers of butylene glycol, pentylene glycol and hexylene glycol, glycerine, trimethylolpropane, pentaerythritol, ethylenediamine and their polyoxyalkylene adducts, mixtures thereof and the like.

Suitable monoepoxy compounds include for example, the α- and β-alkylene oxides and halogenated and arylsubstituted derivatives thereof, glycidyl ethers having from about 3 to about 20 carbon atoms, cyclic ethers such as tetrahydrofuran, mixtures thereof and the like.

Particularly suitable alkylene oxides include, for example, ethylene oxide, propylene oxide, 1,2-butylene oxide, 2,3-butylene oxide, styrene oxide, glycidol, epichlorohydrin, mixtures thereof and the like.

Particularly suitable glycidyl ethers include, for example, allyl glycidyl ether, phenyl glycidyl ether, butyl glycidyl ether mixtures thereof and the like.

The preferred monoepoxy compounds for use in the process according to this invention include ethylene oxide, propylene oxide, 1,2-butylene oxide, 2,3-butylene oxide and mixtures thereof. The process of this invention is particularly suited to the preparation of polyols when the monoepoxy compound reacting with the initiator includes propylene oxide. Propylene oxide is more susceptible than other oxides to isomerization resulting in unsaturation. Ethylene oxide does not give unsaturation via isomerization.

The quantities and types of oxide, and feed sequence (random or block) depends on the eventual equivalent weight of the product to be prepared and what the intended polyurethane application is to be. For example, when polyols of high reactivity are required, the feed sequence will terminate with ethylene oxide to give products containing primary hydroxyl groups.

The polyols prepared according to the process may have an equivalent weight from about 200 to about 5,000, preferably from about 500 to about 4,000 and most preferably from about 1,000 to 2,500. In addition, the polyols should have a total unsaturation content of less than 0.080, preferably less than 0.050, more preferably less than 0.040 and most preferably less than 0.020 milliequivalents/gram polyol.

Optionally, when high polyol reactivity is desired, the polyol will contain end primary hydroxyl groups obtained by advantageously reacting ethylene oxide in the final stage of the alkoxylation reaction. Such polyols are termed EO capped polyols. The quantity of ethylene oxide used as a cap on the polyoxyalkylene polyol (e.g., polyoxypropylene or polyoxybutylene polyol) will depend on the overall polyol reactivity desired and the equivalent weight of the end product. U.S. Pat. No. 4,440,705, incorporated herein by reference, teaches the EO requirements with respect to primary hydroxyl content and polyol equivalent weight when using potassium hydroxide as the alkoxylation catalyst. Advantageously, sufficient quantities of EO are used to give a product having at least 25 percent, preferably at least 45 percent, and more preferably at least 65 percent primary hydroxyl content of the total polyol hydroxyl content. An advantage of preparing polyols by the process of this invention is that for a given primary hydroxyl group content of the polyol, less ethylene oxide is required.

The alkoxylation catalysts used in accordance with the process of this invention include barium, strontium and their oxides, hydroxides, hydrated hydroxides, monohydroxide salts or mixtures thereof. The preferred catalysts are barium hydroxide, hydrated barium hydroxide and monohydroxide barium salts or mixtures thereof and the equivalent strontium compounds.

When preparing polyols by the process of this invention, the initial concentration of the catalyst is such so as to provide for the preparation of the product in an acceptable time. Advantageously, at least 100 ppm, and preferably at least 500 ppm of metal cation based upon the weight of initiator present is suitable for catalyzing the reaction. Preferably, the catalyst is present in an amount from about 0.01 to about 50 percent by weight based upon the weight of the initiator to be reacted.

The quantity of catalyst used to catalyze the reaction should be such that the resulting crude product, prior to neutralization or treatment to remove residual catalyst, contains less than about 20,000, preferably less than about 10,000 and most preferably less than about 5,000 ppm of the metal based on the weight of the end product present. After removal and/or neutralization of the catalyst, the metal cation content of the polyol advantageously is less than about 500 ppm, preferably from about 0.5 to about 100 ppm and more preferably from about 0.5 to about 50 ppm. Catalyst concentrations over and above these ranges are generally not beneficial to the use of the product in the preparation of polyurethanes.

In accordance with the process of the invention the reaction is advantageously conducted at a temperature within the range of 60° C. to 180° C., and preferably within the range of 75° C. to 130° C. The reaction is normally conducted in a closed system at a pressure normally not exceeding 150 pounds per square inch gauge (psig), preferably not exceeding 120 psig and most preferably not exceeding 75 psig. These pressures are maintained by controlling the feed rates of the alkylene oxides and thus the quantity of oxide in the gaseous phase at the reaction temperature. Temperatures and pressures over and above these ranges are generally not beneficial to the quality of resultant product obtained, and products with a high level of color or unsaturation may be produced.

The residual catalyst in the polyols produced by the process of this invention may be neutralized and/or removed by any of the procedures well-known to those skilled in the art, for example, neutralization of the catalyst by acids such as phosphoric acid, sulfuric acid, acetic acid and solid organic acids as described in U.S. Pat. No. 3,000,963. The catalyst may also be removed by the carbon dioxide finishing procedure as described in the Japanese Patent 55/092,733-A, or removed by adsorption on activated clay such as, for example, magnesium silicate.

The polyols produced by the process of the invention may be reacted with polyisocyanates to produce polyurethane polymers. The polyols can be reacted with the polyisocyanates optionally in the presence of other active hydrogen-containing compounds, catalysts, surfactants, stabilizers, fillers, dyes, flame retardants and other additives. Suitable processes for the preparation of polyurethane polymers are discussed in U.S. Pat. Nos. R. 24514, 3,821,130, and G.B. patent 1,534,258 which are herein incorporated by reference. Suitable equipment and processes for the preparation of polyurethane polymers are discussed by J. H. Saunders and K. C. Frisch in "Polyurethanes Chemistry and Technology" Volumes I and II, R. E. Krieger Publishing Company, Inc., ISBN O-89874-561-6, incorporated herein by reference.

The polyols prepared by the process of the invention are useful for the manufacture of polyurethane polymers in a variety of application areas. Areas include flexible slabstock and molded foam, carpet backing and rigid foams for laminate and insulative applications. Non-cellular polyurethane polymers may also be prepared including elastomers suitable for use as coatings, moldings, and shoe soles. Polyurethane polymers made from polyols prepared by the process of the invention show improved foam color (less discoloration), compressive and tensile strengths, flexural modulus and processing properties due to the lower unsaturation levels of the polyol.

In addition, polyols prepared according to the invention may also be used to modify polyisocyanates in the preparation of prepolymers.

The following examples are illustrative of the present invention but are not to be construed as limiting the scope thereof. Unless otherwise stated, all parts are by weight. Unless otherwise stated, the feed rate of the monoepoxy compound is such so as to maintain a constant pressure in the reactor of about 40 to 60 psig until the desired quantity has been fed to the reaction.

The equivalent weight of the products produced is calculated from the hydroxyl number as observed by procedure ASTM E 326-69.

$$\text{equivalent weight} = \frac{56100}{\text{observed hydroxyl number}}.$$

Total unsaturation levels are determined by procedure ASTM D 2849-69. Propenyl unsaturation (vinyl ether) is determined by the procedure documented in *Quantitative Organic Analysis via Functional Groups* by Siggia, 4th edition, ISBN 0-471-03273-5.

All unsaturation values relate to products in which the catalyst has been neutralized and/or removed by filtering.

EXAMPLE 1

An initiator mixture of 203 parts of polyoxypropylene glycol with an equivalent weight of 200 and 47 parts of barium hydroxide octahydrate is heated to 135° C. and flashed until all the hydroxide is dissolved. By the term "flashed" it is meant that water is removed by use of pressures below one atmosphere. Reduced pressures sufficient to remove water but not other volatile products are employed.

To 61 parts of this initiator, 444 parts of propylene oxide is fed at a reaction temperature of 100° C. at such a rate so as to maintain a constant pressure of about 45 to 60 psig. The resulting product has an equivalent weight of 1575 and an unsaturation of 0.020 meq/g (milliequivalents/gram). The product is subsequently capped with 140 parts of ethylene oxide at the same temperatures and pressures to give a final product having an equivalent weight of 1975 and a primary hydroxyl content of 91.4 percent.

EXAMPLE 2

To 42 parts of the initiator of Example 1, 431 parts of propylene oxide is fed at a reaction temperature of 95° C. at such a rate so as to maintain a constant pressure of about 45-60 psig. The resulting product has an equivalent weight of 2,425 and an unsaturation of 0.035 meq/g. The product is subsequently capped with 117 parts of ethylene oxide to give a final product having an equivalent weight of 3,000, a primary hydroxyl content of 93.0 percent and an unsaturation level of 0.028 meq/g.

EXAMPLE 3

To 140 parts of monopropylene glycol (MPG), 75 parts of barium hydroxide monohydrate is added. The mixture is heated to 90° C., and flashed until all the catalyst is dissolved. Propylene oxide is then fed to give an intermediate product having an equivalent weight of 210 and containing about 10 percent by weight barium hydroxide catalyst. To 43 parts of this intermediate product, 300 parts of propylene oxide is fed at 95° C. followed by 90 parts of ethylene oxide. The final product has an equivalent weight of 2,000, a primary hydroxyl content of 90 percent and an unsaturation level of 0.017 meq/g.

EXAMPLE 4

An initiator mixture is prepared from 128 parts of MPG, 28.5 parts of barium hydroxide monohydrate and 67 parts of barium hydroxide octahydrate and maintained at 105° C. whilst flashing until all the catalyst is dissolved. The temperature is then reduced to 95° C. and 350 parts of propylene oxide is fed to give an intermediate product having a molecular weight of about 450.

To 38 parts of this intermediate product a further quantity of 445 parts of propylene oxide is fed at a reaction temperature of 90° C., followed by 98 parts of ethylene oxide. The resulting product has an equivalent weight of 2,735, a primary hydroxyl content of 88 percent and an unsaturation level of 0.022 meq/g.

EXAMPLE 5

The initiator mixture (39 parts) as described in Example 4 is mixed with 36 parts of polyoxypropylene glycol having a molecular weight of about 450. To 41 parts of this resulting mixture, 22 parts of propylene oxide is fed at a reaction temperature of 90° C. and then subsequently 53 parts of ethylene oxide. The resulting product has an equivalent weight of 1,000, a primary hydroxyl content of 72.5 percent and an unsaturation level of 0.009 meq/g.

EXAMPLE 6

To 5 parts of the initiator mixture as described in Example 4, 20 parts of propylene oxide is fed at a reaction temperature of 95° C. The resulting polyoxypropylene glycol has an equivalent weight of 1,150 and an unsaturation level of 0.017 meq/g.

EXAMPLE 7

To 3.15 parts of the initiator mixture as described in Example 4, 25 parts of propylene oxide is fed at a reaction temperature of 95° C. The resulting polyoxypropylene glycol has an equivalent weight of 1,725 and an unsaturation level of 0.024 meq/g.

EXAMPLE 8

A mixture is prepared by dissolving 25 parts of strontium hydroxide octahydrate in 75 parts of MPG at 95° C. and removing the water by vacuum. Propylene oxide (380 parts,) is fed at a reaction temperature of 95° C. to this mixture to obtain an intermediate product having an equivalent weight of about 230. Then to 5 parts of the intermediate product 20 parts of propylene oxide is added. The resulting polyoxypropylene glycol has an equivalent weight of 1,150 and an unsaturation level of 0.018 meq/g.

EXAMPLE 9

A product is obtained by reacting 5 parts of the intermediate as described in Example 8 with 32.5 parts of propylene oxide. The resulting polyoxypropylene glycol has an equivalent weight of 1,585 and an unsaturation level of 0.026 meq/g.

EXAMPLE 10

An initiator is prepared by dissolving at 120° C. barium hydroxide monohydrate in a polyether triol having a molecular weight of 450. A vacuum is applied until all catalyst has dissolved, giving a solution containing 0.075 mole catalyst/mole OH. To 30 parts of this initiator, 350 parts of propylene oxide is added at a temperature of 110° C., followed by 62 parts of ethylene oxide to give a capped product containing 14 weight percent ethylene oxide. The resulting product has an equivalent weight of 2,150, a primary hydroxyl content of 84.1 percent and an unsaturation level of 0.035 meq/g.

EXAMPLE 11

An initiator is prepared as in Example 10, but having a catalyst concentration of 0.067 mole of catalyst/mole OH. To 34 parts of this initiator is added 400 parts of propylene oxide at a reaction temperature of 130° C. followed by 71 parts of ethylene oxide to give a capped product containing 14 percent by weight ethylene oxide. The resulting product has an equivalent weight of 1975, a primary hydroxyl content of 81.8 percent and an unsaturation level of 0.073 meq/g.

EXAMPLE 12

An initiator is prepared as in Example 10, but having a catalyst concentration of 0.106 mole of catalyst/mole OH. To 35 parts of this initiator is added 493 parts of propylene oxide at a reaction temperature of 100° C. followed by 93 parts of ethylene oxide. The resulting product has an equivalent weight of 2,390, a primary hydroxyl content of 87.6 percent and an unsaturation level of 0.032 meq/g.

EXAMPLE 13

An initiator is prepared as in example 10, but having a catalyst concentration of 0.106 mole of catalyst/mole OH. To 35 parts of this initiator is added 700 parts of propylene oxide at a reaction temperature of 100° C. followed by 130 parts of ethylene oxide. The resulting product has an equivalent weight of 2,740, a primary hydroxyl content of 89.8 percent and an unsaturation level of 0.034 meq/g.

EXAMPLE 14

An initiator is prepared as in Example 10, but having a catalyst concentration of 0.106 mole of catalyst/mole OH. To 35 parts of this initiator is added 950 parts of propylene oxide at a reaction temperature of 100° C. followed by 174 parts of ethylene oxide. The resulting product has an equivalent weight of 3,400, a primary hydroxyl content of 88.8 percent and an unsaturation level of 0.039 meq/g.

EXAMPLE 15

Polyether polyols having equivalent weights of 1,350 and 1,650 and containing 12 percent and 15 percent ethylene oxide (capped), respectively, are prepared by the process of the invention using barium hydroxide catalyst and initiator as described in Example 10. Similar comparative polyols are made using potassium hydroxide catalyst. Table I gives the products and their total unsaturation concentration and the unsaturation of propenyl character.

TABLE I

| Product eq wt (% EO) | Cata. Conc. m/mOH[1] | Reac Temp (°C.) | Total Uns.[2] meq/g | Propenyl Uns.[3] meq/g | Primary Hydroxyl % |
|---|---|---|---|---|---|
| 1350 (12%) | (Ba)0.085 | 120 | 0.033 | 0.001 | 75 |
| 1650 (15%) | (Ba)0.085 | 115 | 0.030 | 0.005 | 83 |
| 1350[4](12%) | (K)0.085 | 120 | 0.061 | 0.005 | 70 |
| 1650[4](15%) | (K)0.085 | 115 | 0.061 | 0.008 | 80 |

[1]Catalyst concentration - moles of catalyst/moles of initiator OH. (Ba) - barium hydroxide; (K) - potassium hydroxide.
[2]Total unsaturation.
[3]Propenyl unsaturation.
[4]Comparative data, not an example of this invention.

As can be seen from this data, polyether polyol preparation with the catalysts of this invention results in significantly lower unsaturation in the end product. In addition, it can be seen that the propenyl fraction of the unsaturation is significantly reduced, with data showing reductions of from about 30 to 80 percent depending on the equivalent weight of the product and temperature of alkoxylation. Polyurethane polymers prepared with polyols having a reduced propenyl unsaturation show improved stability when exposed to acidic or humid conditions, and a reduced tendency to exhibit scorching in foams.

COMPARATIVE EXAMPLE A

An initiator is prepared by dissolving potassium hydroxide at 120° C. in a polyoxypropylene diol having an equivalent weight of 200. Sufficient potassium hydroxide is dissolved to provide a solution containing 0.041 mole of catalyst/mole OH. To 50 parts of this initiator, 330 parts of propylene oxide is fed at a reaction temperature of 90° C. The resulting product has an equivalent weight of 1,575 and an unsaturation level of 0.044 meq/g. This compares to an unsaturation level of 0.020 meq/g in Example 1, even though Example 1 was obtained in a process run at a higher temperature which normally increases unsaturation.

COMPARATIVE EXAMPLE B

To 34 parts of the initiator of Comparative Example A, 200 parts of propylene oxide is reacted at a temperature of 90° C. and then subsequently with 32 parts of ethylene oxide. The resulting product has an equivalent weight of 1,000 and an unsaturation level of 0.024 meq/g. This compares to an unsaturation level of 0.009 meq/g in Example 5, at an identical process temperature.

COMPARATIVE EXAMPLE C

An initiator is prepared by dissolving potassium hydroxide at 120° C. in polyoxypropylene glycol having a molecular weight of 134. Sufficient potassium hydroxide is dissolved to give a solution containing 0.016 mole catalyst/mole OH with all water removed. To 26.6 parts of this initiator, 660 parts of propylene oxide is added at a reaction temperature of 95° C., and then 164 parts of ethylene oxide is added. The resulting product has an equivalent weight of 2,100 and an unsaturation level of 0.048 meq/g. This compares to an unsaturation level of 0.017 meq/g in Example 3 prepared from a monopropylene glycol.

COMPARATIVE EXAMPLE D

An initiator is prepared by dissolving potassium hydroxide at 120° C. in a triol having a molecular weight of 450. A vacuum is applied until all catalyst has dissolved giving a solution containing 0.085 mole catalyst/mole OH. To 45 parts of this initiator, 625 parts of propylene oxide is added at a temperature of 110° C., followed by 105 parts of ethylene oxide to give a capped product containing 13.5 weight percent ethylene oxide. The resulting product has an equivalent weight of 2,025, a primary hydroxy content of 78 percent and an unsaturation level of 0.084 meq/g. These values compare to a primary hydroxyl content of 84.1 percent and unsaturation of 0.035 meq/g for Example 10.

COMPARATIVE EXAMPLE E

To 45 parts of the initiator of Comparative Example D, 690 parts of propylene oxide is reacted at 130° C. followed by 130 parts of ethylene oxide to give a capped product containing 15 percent by weight ethylene oxide. The resulting product has an equivalent weight of 1,955, a primary hydroxyl content of 80 percent and an unsaturation level of 0.143 meq/g. These values compare to a primary hydroxyl content of 81.8 percent and unsaturation of 0.073 meq/g for Example 11.

COMPARATIVE EXAMPLE F

To 31 parts of the initiator of Comparative Example D, 625 parts of propylene oxide is reacted at 95° C. followed by 62 parts of ethylene oxide to give a capped product. The resulting product has an equivalent weight of 2,430, a primary hydroxyl content of 80.5 percent and an unsaturation level of 0.065 meq/g. These values compare to a primary hydroxyl content of 87.6 percent and unsaturation of 0.032 meq/g for Example 12, even though Example 12 was obtained in a process run at a higher temperature which normally increases unsaturation.

As can be seen from the examples presented, preparation of high equivalent weight polyether polyols by the process of this invention gives products with greatly reduced total unsaturation and significantly reduced propenyl unsaturation. In addition, this invention allows for products to be prepared at higher reaction temperature and catalyst concentration than could normally be used when employing potassium hydroxide catalysis, without disadvantageously increasing the unsaturation levels.

As can be seen from Examples 10, 11 and 12 and Comparative Examples D, E and F, the primary hydroxyl content of polyols with similar equivalent weight and total ethylene oxide content as a cap is significantly higher when they are prepared according to the process of this invention. The increase in primary hydroxyl content resulting from the capping reaction may be as much as 7 percent of the total hydroxyl content and 9 percent of the primary hydroxyl content. Thus, by use of the process of this invention, capping efficiency may be increased by up to 9 percent.

What is claimed is:

1. A polyurethane polymer prepared by the reaction of a polyisocyanate with a polyoxyalkylene polyol composition wherein said composition comprises
   (a) a polyoxyalkylene polyol having an equivalent weight from about 200 to about 5,000 and an average functionality of about 2 to about 8, and
   (b) from about 0.5 to about 20,000 ppm of a metal catalyst selected from the group consisting of barium, strontium and their oxides, hydroxides, hydrated hydroxides or monohydroxide salts, or mixtures thereof.

* * * * *